April 9, 1935.  E. A. DAVIS ET AL  1,997,362
BUCKET
Filed June 19, 1934
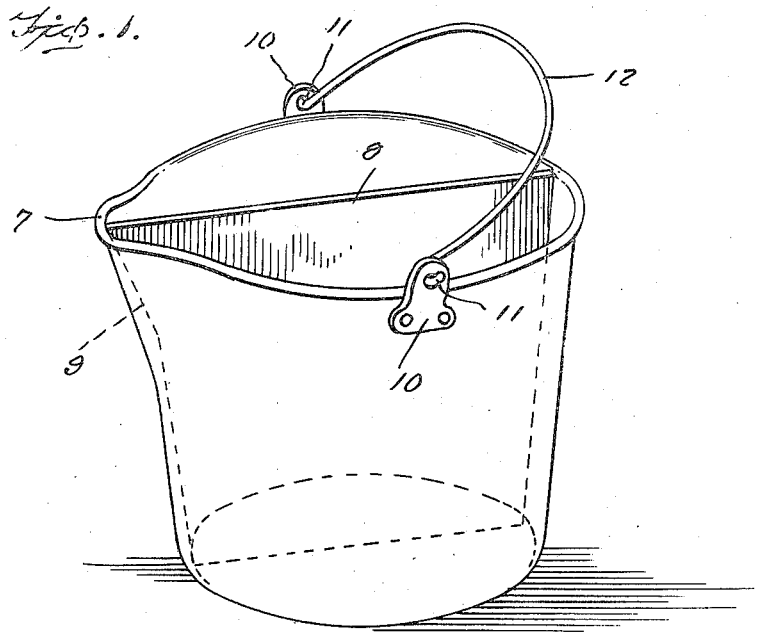
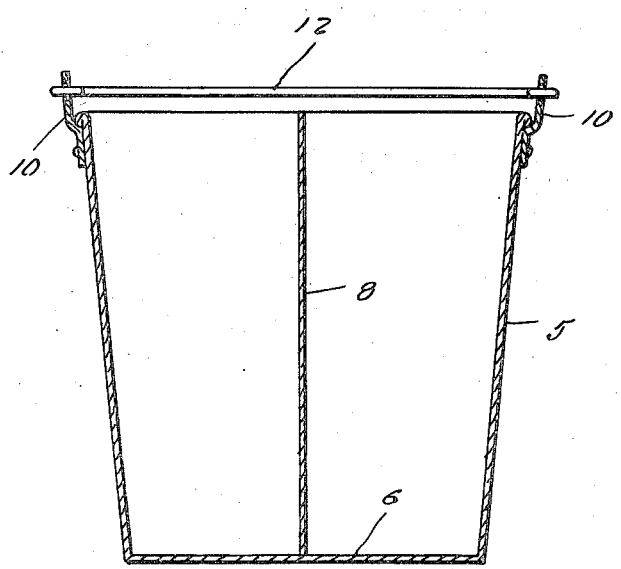
Inventors
E. A. Davis
M. N. Davis
By Clarence A. O'Brien
Attorney Patented Apr. 9, 1935

1,997,362

UNITED STATES PATENT OFFICE 1,997,362

BUCKET

Edward A. Davis and Merle N. Davis, Springfield, Ill.

Application June 19, 1934, Serial No. 731,333

2 Claims. (Cl. 220—22)

This invention appertains to new and useful improvements in metallic receptacles and more particularly to a novel bucket having a partition therein whereby materials of different kinds can be placed in the separate compartments.

The principal object of the present invention is to provide a bucket partitioned so as to form several compartments, to the end that it will be particularly useful in cleaning various articles, because soapy water can be placed in one compartment and rinse water in the other.

During the course of the following specification, other important objects and advantages of the invention will become apparent to the reader.

In the drawing:

Figure 1 is a perspective view of the bucket.

Figure 2 is a vertical sectional view through the bucket.

Referring to the drawing wherein like numerals designate like parts, it can be seen that the numeral 5 represents the metallic bucket having the bottom wall 6. A vertical side portion of the bucket is inclined outwardly so as to define a spout 7 at the top of the bucket. Numeral 8 represents a partition for dividing the interior of the bucket into two separate compartments, this partition being provided with an inclined portion 9 for extension into the spout 7 so as to divide the spout 7.

Apertured lobes 10—10 are located at the upper edge of the bucket and on a line crossing the top of the partition 8 at right angles thereto, these lobes being adapted to receive the hook ends 11 of the handle or bail 12.

It can now be seen that the handle 12 when thrown to the right in Figure 1 will be entirely out of the way when the contents of the two compartments are to be used. When it is desired to empty the bucket, the handle 12 is gripped in one hand while the bucket is tilted so that the contents of both compartments pour out of the same spout 7.

While the foregoing specification sets forth the invention in specific terms, it is to be understood that numerous changes in the shape, size, and materials may be resorted to without departing from the spirit and scope of the invention as claimed hereinafter.

What is claimed is:

1. A bucket provided with a spout at the upper edge thereof, and a partition extending vertically in the bucket, and having one edge extending into the spout for dividing the spout between the compartments defined by the partition.

2. A bucket provided with a spout at the upper edge thereof, and a partition extending vertically in the bucket, and having one edge extending into the spout for dividing the spout between the compartments defined by the partition, and a handle bail having its ends connected to the upper edge of the bucket on a line substantially at right angles to the said partition.

EDWARD A. DAVIS.
MERLE N. DAVIS.